(12) United States Patent
Tiemann

(10) Patent No.: US 8,572,982 B2
(45) Date of Patent: Nov. 5, 2013

(54) DIFFUSER HAVING DISTRIBUTION ELEMENT FOR PROVIDING PART-FLOW

(75) Inventors: Peter Tiemann, Witten (DE); Iris Oltmanns, legal representative, Witten (DE)

(73) Assignee: Siemens Aktiengesellschaft, München (DE)

( * ) Notice: Subject to any disclaimer, the term of this patent is extended or adjusted under 35 U.S.C. 154(b) by 1152 days.

(21) Appl. No.: 12/500,816

(22) Filed: Jul. 10, 2009

(65) Prior Publication Data

US 2009/0272120 A1   Nov. 5, 2009

Related U.S. Application Data

(63) Continuation of application No. 10/568,735, filed as application No. PCT/EP2004/007947 on Jul. 16, 2004, now Pat. No. 7,574,864.

(30) Foreign Application Priority Data

Aug. 18, 2003  (EP) .................................... 03018566

(51) Int. Cl.
*F02C 7/18* (2006.01)
(52) U.S. Cl.
USPC ............. 60/751; 60/806; 415/115; 415/121.2
(58) Field of Classification Search
USPC ......... 60/751, 736, 806; 415/115, 116, 121.2, 415/169.1, 208.2, 211.2
See application file for complete search history.

(56) References Cited

U.S. PATENT DOCUMENTS

| | | | |
|---|---|---|---|
| 3,299,632 A | 1/1967 | Wilde et al. | |
| 4,194,359 A | 3/1980 | Brookman et al. | |
| 4,796,429 A | 1/1989 | Verdouw | |
| 4,870,826 A | 10/1989 | Daguet et al. | |
| 5,175,994 A * | 1/1993 | Fox et al. .................... | 60/39.58 |

(Continued)

FOREIGN PATENT DOCUMENTS

| | | |
|---|---|---|
| DE | 196 39 623 A1 | 4/1998 |
| EP | 1 074 792 A1 | 2/2001 |
| FR | 2 706 533 A1 | 12/1994 |

OTHER PUBLICATIONS

Lefebvre, A.H., Gas Turbine Combustion, Second Edition, Taylor & Francis, Philadelphia, 1998, pp. 71-78.*

*Primary Examiner* — Gerald L Sung
*Assistant Examiner* — Lorne Meade

(57) ABSTRACT

The invention relates to a gas turbine, for energy generation, with a compressor, arranged coaxially to a rotor, mounted such as to rotate, for the compression of an inlet gaseous fluid, at least partly serving for combustion of a fuel in a subsequent annular combustion chamber, with generation of a hot working medium, with an annular diffuser arranged coaxially to the rotor, between the compressor and the annular combustion chamber, for distribution and deflection of the fluid, whereby a part of the fluid is diverted as cooling fluid for the turbine stages after the combustion chamber, by means of a dividing element, arranged in the fluid flow. According to the invention, a compact diffuser and an economical gas turbine with an improved flow for the diversion of cooling air may be achieved, whereby the annular dividing element, arranged coaxially to the rotor, comprises at least one opening, facing the fluid flow and the dividing element is supported on the diffuser, by means of several hollow rib-like support elements, by means of which the cooling fluid, diverted through the opening, is first directed towards the rotor.

10 Claims, 3 Drawing Sheets

(56) References Cited

U.S. PATENT DOCUMENTS

| | | |
|---|---|---|
| 5,619,855 A | 4/1997 | Burrus |
| 5,996,331 A | 12/1999 | Palmer |
| 6,334,297 B1 * | 1/2002 | Dailey et al. ............ 60/785 |
| 6,564,555 B2 * | 5/2003 | Rice et al. ............ 60/746 |
| 6,672,072 B1 * | 1/2004 | Giffin, III ............ 60/782 |
| 7,334,412 B2 * | 2/2008 | Tiemann ............ 60/785 |
| 7,574,864 B2 * | 8/2009 | Oltmanns et al. ............ 60/736 |
| 8,082,738 B2 * | 12/2011 | Cornelius et al. ............ 60/751 |

\* cited by examiner

DIFFUSER HAVING DISTRIBUTION ELEMENT FOR PROVIDING PART-FLOW

CROSS REFERENCE TO RELATED APPLICATIONS

This application is a continuation of U.S. Ser. No. 10/568,735, now U.S. Pat No. 7,574,864 filed on Feb. 17, 2006. This application is the US National Stage of International Application No. PCT/EP2004/007947, filed Jul. 16, 2004 and claims the benefit thereof. The International Application claims the benefits of European Patent application No. 03018566.4 EP filed Aug. 18, 2003. All of the applications are incorporated by reference herein in their entirety.

FIELD OF THE INVENTION

The invention relates to a gas turbine in accordance with the claims and to a diffuser in accordance with the claims.

BACKGROUND OF THE INVENTION

DE 196 39 623 has disclosed a gas turbine for power generation having a compressor and an annular combustion chamber. A diffuser, which diverts the compressed air provided by the compressor at the annular compressor outlet in the direction of the burner arranged at the end side of the annular combustion chamber, is arranged between the compressor and the annular combustion chamber. For this purpose, the diffuser has flow-guiding contours as well as a metal diverter sheet which is C-shaped in cross section and is secured by a holder crossing the flow passage. Furthermore, a plurality of stationary removal tubes distributed over the circumference are arranged in the diffuser, coaxially with respect to the rotor, for removing cooling air, which removal tubes remove cooling air at the compressor outlet and pass it to the turbine stages of the gas turbine.

The holder for the C-shaped metal diverter sheet constitutes an obstacle blocking the flow passage formed by the diffuser. The arrangement of the removal tubes also interferes with the air which is flowing in the diffuser and is passed to the burners. This can give rise to flow losses. Furthermore, the tubes, which are distributed over the circumference, have to have a minimum diameter required to ensure that sufficient cooling air is provided for the turbine stages, so that not only the compressed air which flows out of the center of the compressor outlet but also the compressed air at the edge of the compressor outlet is removed.

Furthermore, FR2706533 has disclosed a diffuser for a turbomachine, in which a part-stream is removed in the diffuser in order to set a cabin pressure, to deice the body of the machine or to start the engine of an aircraft. A wedge-shaped distribution element, which initially divides the compressor end air flow into two part-streams, is arranged in the widening flow passage of the diffuser. Then, a third part-stream is removed from the inner part-stream through an opening arranged behind the tip of the distribution element. This third part-stream is routed outward through the hollow ribs which support the distribution element against the outer wall. The third part-stream removed in this way is then used for the above-mentioned purposes. In a further configuration, the diffuser which is known from FR2706533 has an inner and outer ribs supporting the distribution element. The inner ribs are in this case provided with an opening for decoupling the part-flow, through which opening the third part-flow that is to be decoupled can enter the cavity in the rib.

Since the part-flow removed in this way is used for deicing or, for example, to set the cabin pressure, the demands imposed on the air flow in terms of degree of contamination, pressure and temperature are relatively low.

By contrast, relatively high demands are imposed on the cooling air for the turbine blades and vanes of a stationary gas turbine, in order on the one hand to achieve a particularly high efficiency and on the other hand to avoid or reduce blockages or cross-sectional narrowings of impingement cooling openings or film cooling holes caused by particle deposits.

SUMMARY OF THE INVENTION

Therefore, the object of the present invention is to provide a compact diffuser with a partial air removal and a gas turbine having a diffuser of this type, which allows improved removal, in terms of fluid dynamics, of a part-flow used as cooling fluid for turbine blades and vanes. Furthermore, the part-flow needs to satisfy the demands relating to the degree of contamination, pressure and temperature required for use as cooling fluid in a gas turbine.

The object relating to the gas turbine is achieved by the features of the claims. Advantageous configurations are given in the claims.

The solution with regard to the gas turbine provides that to decouple a part-stream that can be used as cooling fluid, the opening is provided on the leading edge, facing the flow, of the distribution element (35) in the form of an annular gap opening (49) in the central region between the outer wall and the inner wall. The distribution of the compressed fluid takes place in a space-saving diffuser, which allows the cooling fluid for turbine stages to be removed in a manner which is favorable in terms of flow and causes little turbulence and loss. At the same time, it is possible for the remaining fluid to be passed onward in a favorable manner in the direction of its subsequent areas of use, the annular combustion chamber walls. The distributed fluid streams cross one another without being significantly impeded and without generating flow losses, since the supporting elements are provided with a streamlined profile.

If possible, a particularly clean and cool cooling fluid is usually employed. (Suspended) particles contained in the cooling fluid can be deposited at the impingement cooling openings of impingement-cooled components, such as for example turbine blades or vanes, which are exposed to a hot gas, and in the worst possible scenario even block these openings.

On account of the swirl in the fluid which is present at the compressor outlet and in the annular flow passage, (suspended) particles which it has been impossible to filter out by mechanical means seek to move toward the radially inner and outer edges of the flow passage. Likewise, higher temperatures and a lower pressure in the fluid are present at the radially inner and outer edges of the flow passage than in the center lying between them. Consequently, the annular opening is arranged at precisely the position in the diffuser at which the fluid which is most suitable for the cooling of the turbine stages is flowing. As a result, the fluid which is most suitable for cooling automatically flows into the distribution element, forming a dynamic pressure, and is thereby separated from the remaining fluid, which is less suitable for turbine cooling. The remaining fluid, which is subsequently used for combustion, is warmer than the decoupled cooling fluid and is at a lower pressure.

The coaxial annular gap opening causes the fluid to be decoupled as cooling fluid over the entire circumference of the annular distribution element. Accordingly, the annular gap can be made narrower than the diameter of the removal tubes known from the prior art. In this way, only the coolest, cleanest fluid provided with the highest pressure is decoupled as cooling fluid downstream of the compressor outlet or diffuser inlet.

In an advantageous configuration, the distribution element is reinforced and strengthened by ribs which are provided in the annular gap, run in the axial direction and are distributed over the circumference of the annular gap. At the same time, these ribs serve as guide elements in the distribution element for the cooling fluid which has already been decoupled, so that it is routed in the direction of the supporting element. It is therefore advantageous for the annular gap opening to be segmented along the circumference.

The walls which form the flow passage are already diverging in the portion of the flow passage which the distribution element is connected upstream of. This increases the pressure in the fluid, which has a positive effect on the pressure of the decoupled cooling fluid.

If the annular distribution element is designed in a wedge shape by means of two walls and is arranged centrally between the two diverging walls of the diffuser, so that in each case one wall of it and the opposite wall of the diffuser in each case form an annular part-passage for the fluid, it is possible for the fluid intended for combustion of a fuel to be divided into two part-streams of approximately equal size. The radially inner part-stream of the fluid can then still be used to cool the radially inner annular combustion chamber wall before it is used for combustion, and the part-stream of the fluid which is routed radially outward can be used to cool the radially outer annular combustion chamber wall.

A particularly low-loss flow profile for the two part-streams can be achieved if the two part-passages have a substantially constant cross section of flow over their flow length.

For reliable securing of the distribution element and for low-loss crossing of the decoupled cooling fluid through the radially inner part-stream, the hollow supporting elements which route the cooling fluid in the interior are supported against the inner wall located on the radially inner side. This allows the cooling fluid which has been decoupled or removed by the distribution element in the center of the fluid flow to be diverted in the direction of the rotor with low losses.

The decoupled cooling fluid can be routed to the turbine unit in a particularly simple way if it is routed radially inward by the supporting element in order to be made available to the turbine stages in a manner which is favorable in terms of fluid dynamics. For this purpose, the cavity in the supporting element is in communication with an annular passage which is located further radially inward, is arranged between the combustion chamber and the rotor and can pass the cooling fluid on to the turbines.

The fluid is expediently compressor air. A particularly cool cooling air can be made available to the turbine stages if a tube with a nozzle runs through the cavity in the outer supporting elements, which nozzle opens out downstream of the opening, as seen in the direction of flow, and by means of which a liquid for generating heat of evaporation can be injected into the cooling fluid stream. As a result, less cooling air is required, with the result that the opening can be made narrower and cooling air can be saved. Likewise, the diffuser and the distribution element can be made more compact. The cooling air saving likewise leads to an increase in the efficiency of the gas turbine.

It is expediently possible for a tube to extend through the cavity in the outer supporting elements, which tube opens out in a passage which is arranged in the distribution element and is flow-connected to the radially inner part-passage, so that a fuel can be introduced into the part-passage. An inexpensive option is to use water as the liquid.

The object relating to the diffuser is achieved by the features of the claims. The associated advantages correspond to those explained in the statements given above.

BRIEF DESCRIPTION OF THE DRAWINGS

The invention is explained with reference to a drawing, in which.

DETAILED DESCRIPTION OF THE INVENTION

Figure 3:
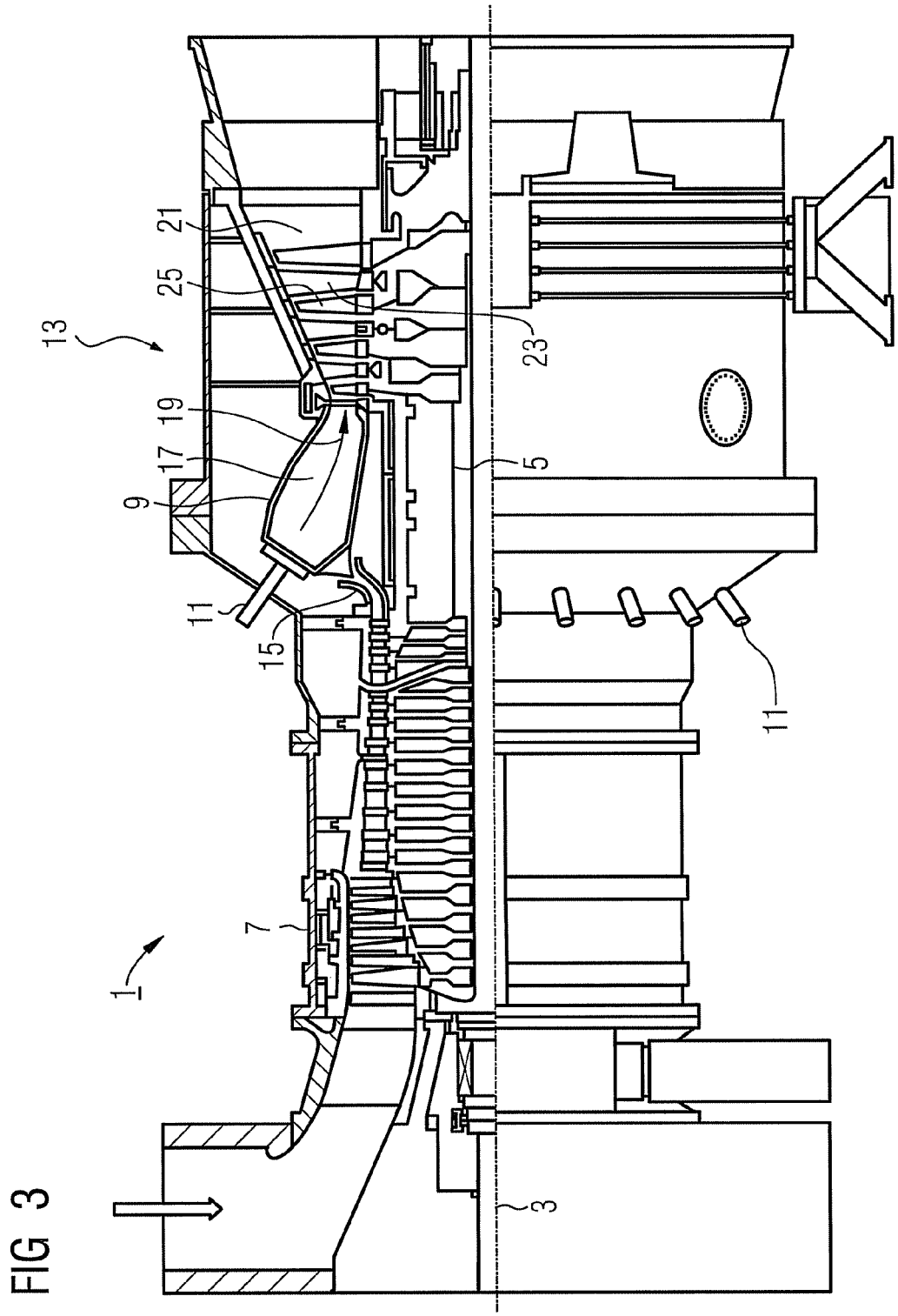
FIG. 3 shows a partial longitudinal section through a gas turbine.

FIG. 3 shows a gas turbine 1 with a rotor 5 which is mounted such that it can rotate about an axis of rotation 3. Along the rotor 5, the gas turbine 1 has a compressor 7, an annular combustion chamber 9 and a turbine 13, which is formed by four successive turbine stages. A plurality of burners 11 are provided at the annular combustion chamber 9, distributed over its circumference.

The compressor 7 draws in ambient air, compresses it and transfers it to a downstream diffuser 15, which is secured to the annular combustion chamber end of the compressor 7. The compressed air is distributed in the diffuser 15. The majority of the air is routed along the annular combustion chamber 9 for cooling purposes then mixed with a fuel, after which it is burnt by means of the burners 11 in the annular combustion space 17 to form a hot working medium 19. In the turbine 13, the working medium 19 flows past guide vanes 23 and rotor blades 25 in the hot-gas duct 21. As it does so, the working medium 19 expands at the rotor blades 25 secured to the rotor 5, so as to drive these blades. The rotational energy, which can be tapped off at the rotor 5, is used to drive an electrical generator.

Figure 1:
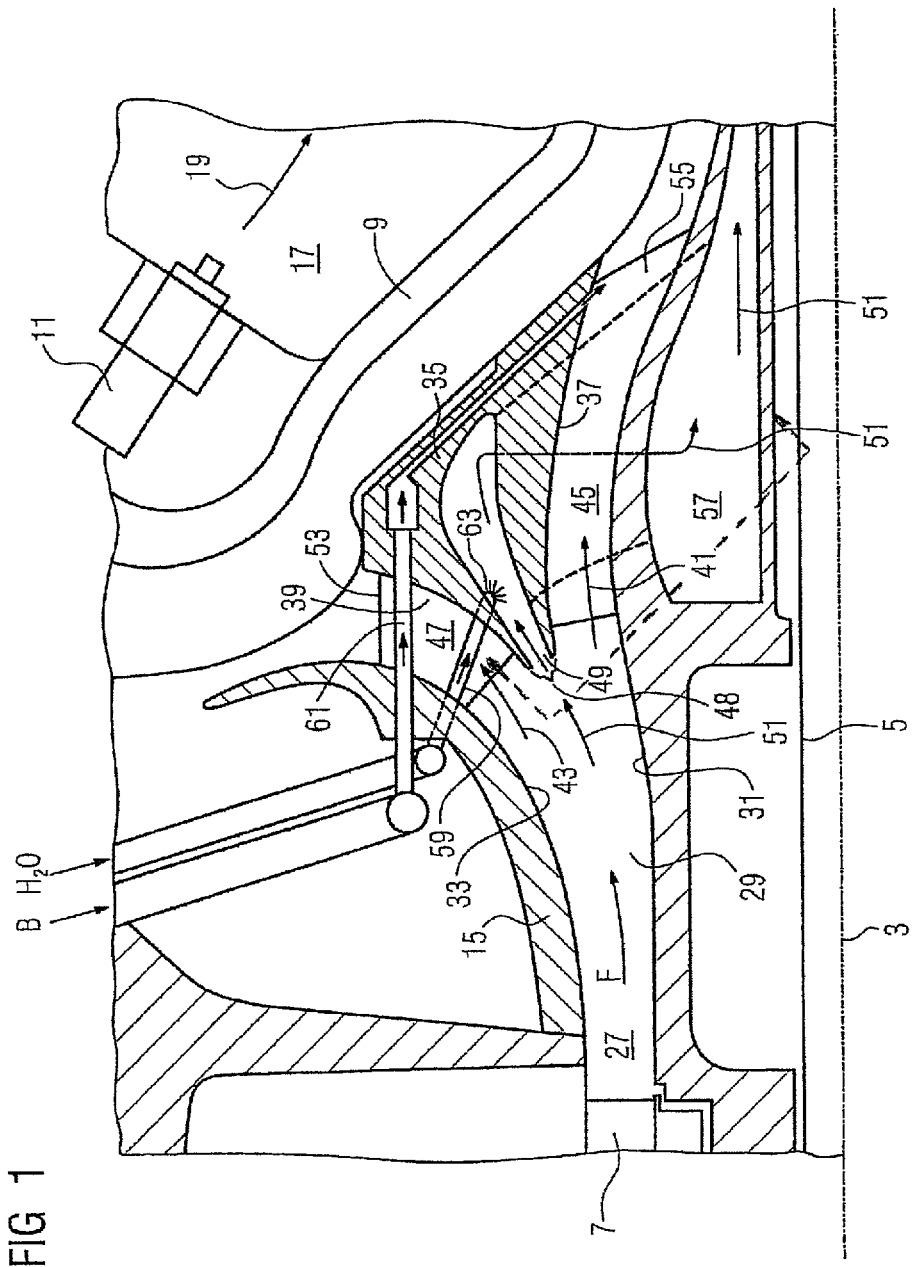
FIG. 1 shows a diffuser with a distribution element arranged between the compressor outlet and the annular combustion chamber.

FIG. 1 shows the annular diffuser 15 arranged between compressor 7 and annular combustion chamber 9 in detail. From a diffuser inlet 27, the diffuser 15 initially extends in the axial direction toward the annular combustion chamber 9. A flow passage 29 is delimited by an inner wall 31 located on the radially inner side and an outer wall 33 located on the radially outer side. The two walls 31, 33 diverge in the direction of flow of the fluid F.

As the flow passage 29 continues, an annular distribution element 35 that is wedge-shaped in cross section is arranged in the diffuser 15, coaxially with respect to the rotor 5. The distribution element 35 has a wall 37 which lies opposite the inner wall 31 located on the radially inner side and a wall 39 which lies opposite the outer wall 33 located on the radially outer side. The wall 37, together with the inner wall 31 located on the radially inner side, forms a part-passage 45 for a part-stream 41. A further part-passage 47 for a further part-stream 43 is delimited by the wall 39 and the outer wall 33 located on the radially outer side.

At its leading edge 48 facing the flow of fluid F, the annular distribution element 35 has an annular gap opening 49.

Upper supporting elements 53, which are of rib-like and streamlined configuration, extend between the outer wall 33 located on the radially outer side and the wall 39. Similarly shaped lower supporting elements 55 extend between the wall 37 and the inner wall 31 located on the radially inner side. The annular distribution element 35 is positioned and held in the annular diffuser 15 by means of the supporting elements 53, 55. The supporting elements 53, 55 are each of hollow design. The lower supporting elements 55 are flow-connected to the annular gap element 49, on the one hand, and to the annular passage 57 that coaxially surrounds the rotor 5, on the other hand.

A water tube 59, which ends in the distribution element 35 downstream of the annular gap opening 49, as seen in the direction of flow, can be fitted radially from the outside through the upper supporting element 53. An injection nozzle 63 is secured to that end of the water pipe 59 which faces the distribution element 35. At the opposite end, the water pipe 59 is connected to a water source.

A further fuel pipe 61, which passes through the upper supporting element 53, extends into the distribution element 35, where it is in communication with a passage which opens out into the first part-passage 45. A fuel B can be fed to the fuel pipe 61. While the gas turbine 1 is operating, air which has been compressed by the compressor 7 flows as fluid F through the diffuser inlet 27 into the diffuser 15. The wedge-shaped distribution element 35 divides the fluid F into two part-streams 41, 43 of approximately equal size and a middle part-stream 51. The part-stream 51, in the region of the leading edge 48, flows into the annular gap passage 49 and is thereby removed or decoupled from the fluid flow.

The first part-stream 41 is routed to the annular combustion chamber wall located on the radially inner side. From there, the part-stream 41 flows along the annular combustion chamber wall, cooling the latter, and is then mixed with a fuel in the burner 11. The mixture is then burnt in the annular combustion chamber 9 to form the hot working medium 19.

The part-stream 43 which flows within the further part-passage 47, after it has emerged from the diffuser 15, is routed to the radially outer annular combustion chamber wall, and from there is routed onward into the burner 11, where it is likewise mixed with a fuel and then burnt in the combustion space 17 to form the hot working medium 19.

The middle part-stream 51 flows into the distribution element 35 and is diverted in the direction of the lower supporting elements 55. From there, it flows through the hollow supporting elements 55 in the direction of the rotor 5 and opens out into an annular passage 57. Then, this part-stream 51, as cooling fluid, is routed to the turbine stages parallel to the axis of rotation 3 and used there to cool the guide vanes 23 and rotor blades 25.

The middle part-stream 51 has the most favorable properties for use as a cooling fluid. In the flow passage 29, the compressor air is contaminated to a greater extent with particles in particular in the vicinity of the radially inner and outer walls 31, 33 of the diffuser 15, whereas the middle flow located in between is as far as possible devoid of particles. In addition, the lowest pressure combined with the highest pressure is likewise present in the same region. Therefore, this part of the flow is used to cool the blades and vanes arranged in the turbine.

The temperature of the middle part-stream 51 can be additionally reduced by water $H_2O$ being injected downstream of the annular gap opening 49 through the water pipe 59. The nozzle 63 atomizes the water $H_2O$ to form small beads of water, so that it can evaporate more easily, with the result that it extracts heat from the part-stream 51. As a result, the quantity of cooling fluid required is reduced further, and the opening which extends in the radial direction, in particular the annular gap opening 49, can as a result be made even narrower.

The fuel which mixes with the part-stream 41 is injected through the fuel pipe 61. During the cooling of the radially inner annular combustion chamber wall, the mixture is heated, which has a positive effect on the NOx content in the working medium 19 during combustion, i.e. the NOx content is reduced. As seen in the direction of flow, the fuel B is supplied well downstream of the distribution of the fluid F in the downstream region of the part-passage 45. This prevents backflow of the fuel B and therefore prevents it from mixing with the part-stream 51.

Figure 2:
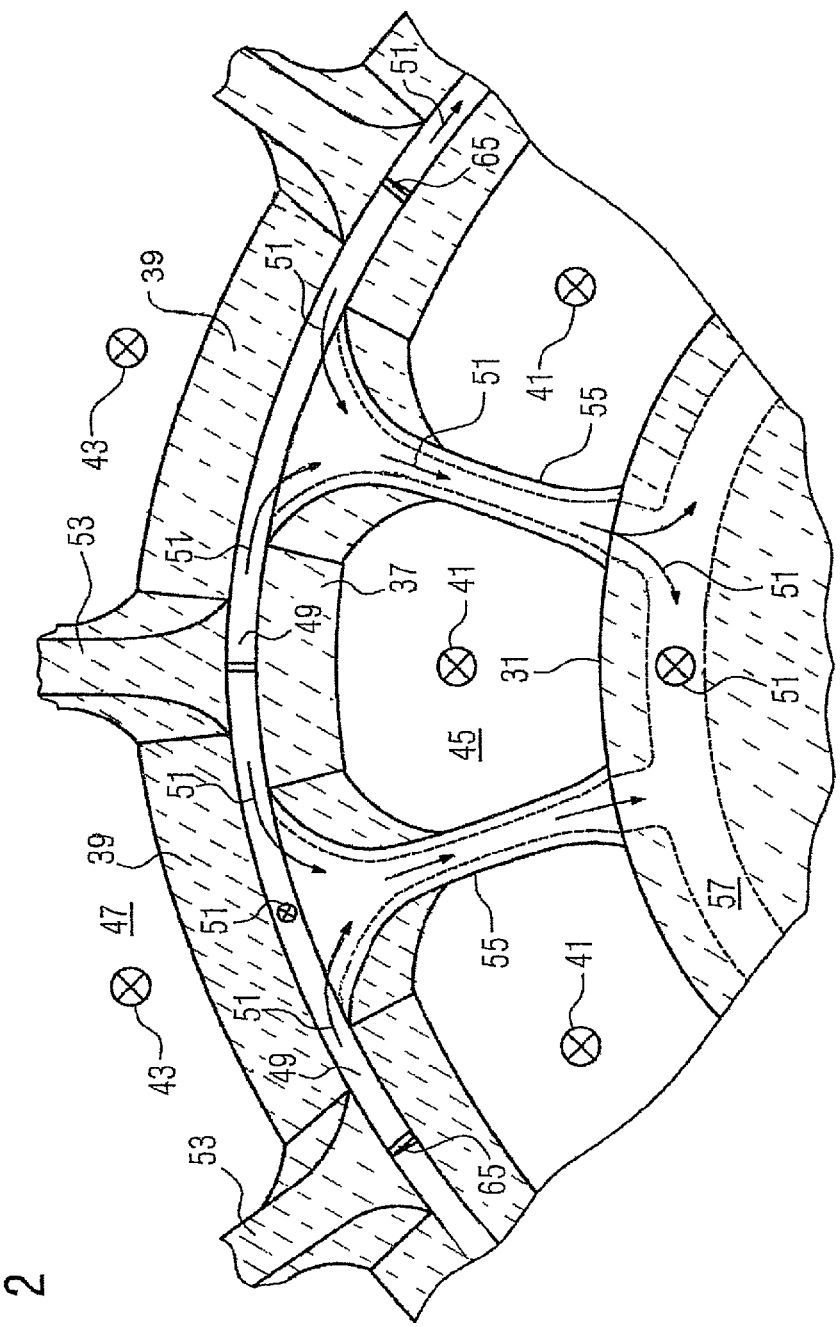
FIG. 2 shows part of a segmented distribution element.

FIG. 2 shows the distribution element 35 as seen in the direction of flow. The distribution element 35 is supported against the inner wall located on the radially inner side by means of the lower supporting elements 55 and against the outer wall 33 located on the radially outer side, which is not shown here, by means of the upper supporting elements 53. The walls 37, 39, together with the opposite walls 31, 33 of the diffuser 15, in each case form a part-passage 45, 47. On its side facing the compressor 7, the distribution element 35 has an annular gap opening 49, which is segmented by means of radially extending ribs 65.

From the compressor 7, the fluid (F) in the diffuser 15 flows in the direction of the distribution element 35, where it is divided into three part-streams 41, 43, 51.

The middle part-stream 51 flows into the annular gap opening 49 and is diverted in the direction of the rotor 5 by the inner contour of the hollow distribution element 35. It then flows through the hollow lower supporting ribs 55 and after that is fed into the annular passage 57, from where the part-stream 51 is routed in the axial direction to the turbine stages and is then used to cool the guide vanes and rotor blades, which are exposed to hot gas, so that their impingement and film cooling openings can provide the specified cooling air for a longer period of time on account of the reduced contamination of the cooling air.

The invention claimed is:

1. A diffuser for extracting cooling air for turbine stages of a gas turbine, comprising:
    an inner wall forming a radially inner side of the diffuser;
    an outer wall forming a radially outer side of the diffuser that provides a flow passage having an inlet and an outlet where the inner and outer walls increasingly diverge along the direction of fluid flow;
    an annular passage bypassing extracted cooling air around a combustion chamber and to the turbine stages, wherein the annular passage is located radially inward of the inner wall;
    an annular distribution element arranged coaxially along a longitudinal axis and between the inner and outer walls of the diffuser having a centrally located opening that creates a cooling air part-stream of the compressor discharge fluid flow, where the distribution element opening is arranged on a leading edge of the distribution element and forms an annular opening in a central region between the outer wall and the inner wall; and
    a plurality of hollow lower and upper supporting elements arranged between the inner and outer walls, respectively, of the diffuser and the annular distribution element wherein at least one of the hollow lower supporting elements is in fluid communication with the annular passage.

2. The diffuser as claimed in claim 1, wherein the distribution element creates a radially outward and a radially inward streams that coaxially surround the centrally located cooling air part stream.

3. The diffuser as claimed in claim 1, wherein a tube including a nozzle is routed through one of the plurality of hollow upper supporting elements, where the nozzle is arranged within the annular opening of the distribution element and injects a cooling fluid into the cooling air part-stream.

4. The diffuser as claimed in claim 3, wherein the cooling fluid is water.

5. The diffuser as claimed in claim 2, wherein a wall of the distribution element is located opposite the inner wall to form a radially inner part-passage and a fuel supply tube extends through a hollow upper supporting element of the plurality of hollow upper supporting elements and wherein the fuel supply tube connects to a passage in the distribution element connected to the radially inner part-passage that defines the radially inward stream and introduces a fuel into the radially inner part-passage.

6. The diffuser as claimed in claim 1, wherein the annular opening is segmented along a circumference of the annular distribution element.

7. The diffuser as claimed in claim 1, wherein the annular distribution element is arranged centrally between the two diverging walls of the diffuser and has a wedge shape defined by two walls such that each distribution element wall and the adjacent diffuser wall form two annular part-passages for the fluid.

8. The diffuser as claimed in claim 7, wherein each of the two annular part-passages have a substantially constant cross section over each flow length of the two annular part-passages.

9. The diffuser as claimed in claim 1, wherein the hollow lower supporting elements route a cooling fluid through an interior of the hollow lower supporting elements and are supported against the diffuser inner wall.

10. The diffuser as claimed in claim 1, wherein the cooling air part-stream is routed toward a rotor of the gas turbine by the hollow lower supporting elements.

* * * * *